(12) United States Patent
Kilzer et al.

(10) Patent No.: US 10,503,686 B2
(45) Date of Patent: Dec. 10, 2019

(54) SPI INTERFACE WITH AUTOMATIC SLAVE SELECT GENERATION

(71) Applicant: Microchip Technology Incorporated, Chandler, AZ (US)

(72) Inventors: Kevin Kilzer, Chandler, AZ (US); Shyamsunder Ramanathan, Tucson, AZ (US); Sai Karthik Rajaraman, Chandler, AZ (US); Justin Milks, Tempe, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 13 days.

(21) Appl. No.: 15/373,219

(22) Filed: Dec. 8, 2016

(65) Prior Publication Data
US 2017/0168980 A1    Jun. 15, 2017

Related U.S. Application Data

(60) Provisional application No. 62/265,395, filed on Dec. 9, 2015.

(51) Int. Cl.
*G06F 13/42* (2006.01)
*G06F 1/10* (2006.01)

(52) U.S. Cl.
CPC ............ *G06F 13/4282* (2013.01); *G06F 1/10* (2013.01); *G06F 13/4291* (2013.01)

(58) Field of Classification Search
CPC .................................................. G06F 13/4282
See application file for complete search history.

(56) References Cited

U.S. PATENT DOCUMENTS

| | | | | |
|---|---|---|---|---|
| 5,542,053 | A * | 7/1996 | Bland | G06F 13/4027 348/E7.084 |
| 5,781,492 | A * | 7/1998 | Gittinger | G06F 12/0638 365/230.01 |
| 5,878,234 | A * | 3/1999 | Dutkiewicz | G06F 13/423 710/110 |
| 9,838,561 | B2 * | 12/2017 | Morino | H04N 1/2158 |
| 2005/0165996 | A1 * | 7/2005 | Vergnes | G06F 13/4217 710/306 |
| 2007/0047579 | A1 * | 3/2007 | Mukhopadhyay | H04J 3/047 370/469 |
| 2009/0137318 | A1 | 5/2009 | Russo et al. | 463/40 |
| 2013/0212311 | A1 * | 8/2013 | Hunsaker | G06F 13/364 710/110 |
| 2015/0149735 | A1 * | 5/2015 | Nale | G06F 11/079 711/147 |

OTHER PUBLICATIONS

"Technical Note 15", SPI Interface Specification, Sep. 19, 2005, VTI Technologies (Year: 2005).*

(Continued)

*Primary Examiner* — Farley Abad
(74) *Attorney, Agent, or Firm* — Slayden Grubert Beard PLLC

(57) ABSTRACT

A serial peripheral interface (SPI) module, comprising a transceiver, the transceiver including a clock line, a data line and at least one slave select line. The SPI also comprises an interface circuit configured to operate in an automatic slave select mode, wherein the interface circuit is configured to automatically assert the slave select line at least one clock before a first clock edge is generated.

22 Claims, 5 Drawing Sheets

(56) References Cited

OTHER PUBLICATIONS

"Technical Note 15 1(5) SPI Interface Specification," VTI Technologies, URL: http://www.mouser.com/pdfdocs/tn15_spiinterface_specification.pdf, 5 pages, Sep. 19, 2005.
International Search Report and Written Opinion, Application No. PCT/US2015/065729, 11 pages, dated Mar. 10, 2017.
European Office Action, Application No. 16820443.6, 4 pages, dated Oct. 9, 2019.

* cited by examiner

SPI INTERFACE WITH AUTOMATIC SLAVE SELECT GENERATION

RELATED PATENT APPLICATION

This application claims priority to commonly owned U.S. Provisional Patent Application No. 62/265,395; filed Dec. 9, 2015; which is hereby incorporated by reference herein for all purposes.

TECHNICAL FIELD

The present disclosure relates to synchronous serial interfaces, in particular, a serial peripheral interface (SPI) with automatic slave select generation.

BACKGROUND

Synchronous serial peripheral devices use separate data and clock lines, wherein a data is synchronously transmitted with the clock signal. The devices are common interface peripherals in microcontrollers. They may also be used in a plurality of stand-alone devices, such as analog-to-digital converters, digital-to-analog converters, sensor devices, transmitters and receivers and any other type of device that needs to communicate with or within a microprocessor or microcontroller.

SUMMARY

Embodiments of the present disclosure include a serial peripheral interface (SPI) module. The module may include a transceiver comprising a clock line, a data line and at least one slave select line. In combination with any of the above embodiments, the module may include an interface circuit configured to operate in an automatic slave select mode. In combination with any of the above embodiments, the interface circuit is configured to automatically assert the slave select line at least one baud clock before a first clock edge is generated. In combination with any of the above embodiments, the interface circuit may be further configured to maintain the slave select line as asserted until a transfer count reaches zero. In combination with any of the above embodiments, the interface circuit may be further configured to de-assert the slave select line a predetermined time after a final clock edge. In combination with any of the above embodiments, the interface circuit may be further configured to de-assert the slave select line one-half baud clock after a final clock edge. In combination with any of the above embodiments, the interface circuit may be further configured to operate in a programmable size byte transfer mode and in a programmable packet transfer mode. In combination with any of the above embodiments, the interface circuit may be further configured to operate in a programmable size byte transfer mode, wherein each byte comprises a programmable number of bits. In combination with any of the above embodiments, the interface circuit may be further configured to operate in a programmable packet transfer mode, wherein a total number of bits to be transferred is programmable, a first parameter defines the number of 8-bit bytes to be transferred for a packet, and a second parameter defines the number of bits of a last transfer for the packet. In combination with any of the above embodiments, the interface circuit may be further configured to assert the slave select line based upon a transfer count including a nonzero value. In combination with any of the above embodiments, the interface circuit may be further configured to assert the slave select line upon determination of an override of the automatic slave select mode. In combination with any of the above embodiments, the interface circuit may be further configured to evaluate a transfer count to determine whether to de-assert the slave select line after removal of the override of the automatic slave select mode.

Embodiments of the present disclosure include a microcontroller or a processor including any of the modules described above.

Embodiments of the present disclosure include a method of operating any of the microcontrollers, processors, or modules described above. Methods may include a method of serial protocol interface data transfer, comprising communicating from a master element to a slave element using a clock line, a data line and at least one slave select line, and operating in an automatic slave select mode. In combination with any of the above embodiments, the method may include automatically asserting the slave select line at least one clock before a first clock edge is generated. In combination with any of the above embodiments, the method may further include maintaining the slave select line as asserted until a transfer count reaches zero. In combination with any of the above embodiments, the method may further include de-asserting the slave select line a predetermined time after a final clock edge. In combination with any of the above embodiments, the method may further include de-asserting the slave select line one-half baud clock after a final clock edge. In combination with any of the above embodiments, the method may further include operating in a programmable size byte transfer mode and in a programmable packet transfer mode. In combination with any of the above embodiments, the method may further include operating in a programmable size byte transfer mode, wherein each byte comprises a programmable number of bits. In combination with any of the above embodiments, the method may further include operating in a programmable packet transfer mode, wherein a total number of bits to be transferred is programmable, a first parameter defines the number of 8-bit bytes to be transferred for a packet, and a second parameter defines the number of bits of a last transfer for the packet. In combination with any of the above embodiments, the method may further include asserting the slave select line based upon a transfer count including a nonzero value. In combination with any of the above embodiments, the method may further include asserting the slave select line upon determination of an override of the automatic slave select mode. In combination with any of the above embodiments, the method may further include evaluating a transfer count to determine whether to de-assert the slave select line after removal of the override of the automatic slave select mode.

DETAILED DESCRIPTION

Figure 1:
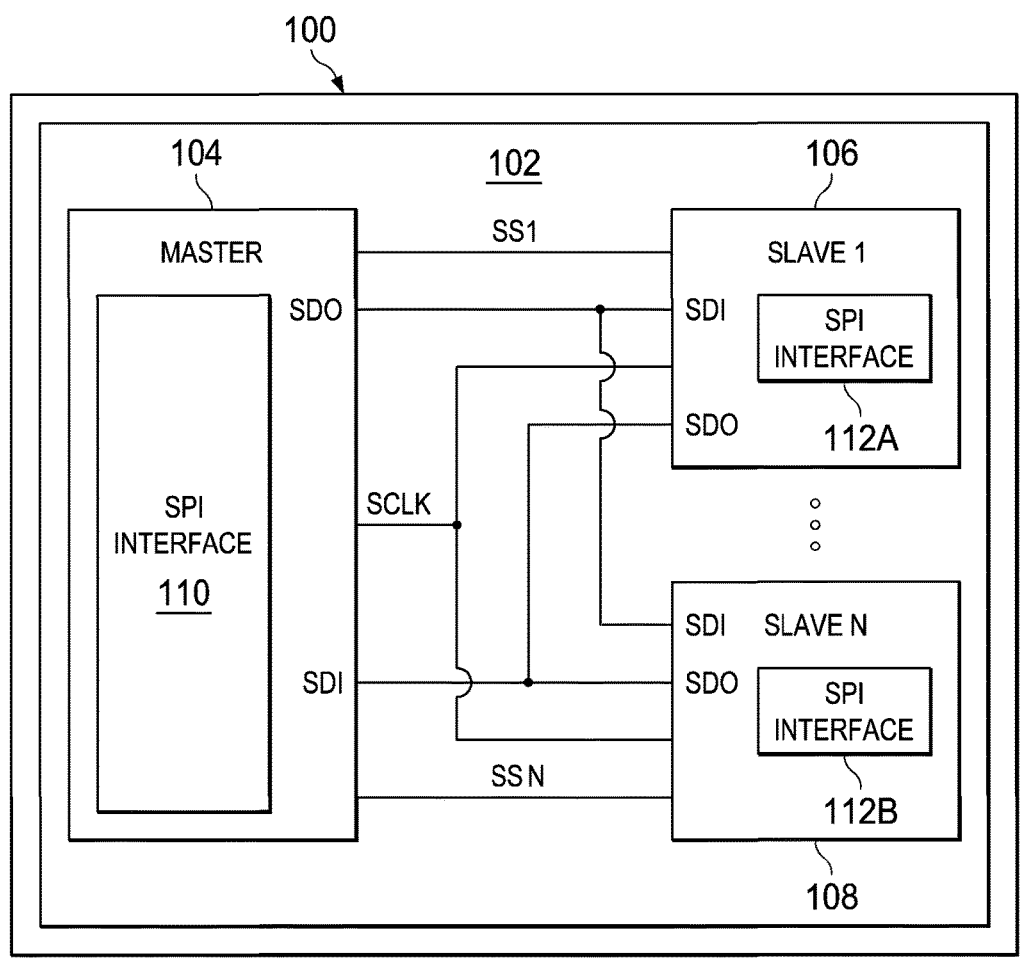
FIG. 1 illustrates an example system with components utilizing SPI interfaces, according to embodiments of the present disclosure.

FIG. 1 illustrates an example system 100 with components utilizing SPI interfaces, according to embodiments of the present disclosure. In one embodiment, the components using SPI interfaces may use an SPI interface that automatically enters slave select mode and issues slave select signals. Such automatic generation of slave select signals may be performed in hardware. The generation of slave select signals may be performed in hardware in contrast to other methods of issuing a slave select signal that are performed upon a software command.

SPI transfers data serially between multiple devices. The serial output data is changed on a particular slave clock edge and the data is sampled on the next slave clock. The slave transfers data when its slave select is asserted. For controlling the flag, the interfaces may comprise a transfer counter and a complex clock generation state machine according to some embodiments.

For example, system 100 may include a component that will communicate with other components as an SPI-protocol master, such as master 104. System 100 may include one or more other components that will communicate with master 104, such as slave 106 and slave 108. System 100 may include any suitable number and kind of components. For example, each of master 104, slave 106, and slave 108 may implement one or more analog-to-digital converters, peripherals, digital-to-analog converters, sensor devices, transmitters and receivers and any other type of device that needs to communicate with or within a microprocessor or microcontroller. Furthermore, although certain elements of system are so-designated as a master or slave elements according to the SPI protocol, any such elements might be configurable as either a master or a slave element according to an initialization by system 100. Thus, in one example, element 104 might be configured as an SPI master and element 106 might be configured as an SPI slave, but in different example, element 104 may be configured as an SPI slave in communication with element 106 which may be configured as an SPI master. Moreover, although two elements 106, 108 are illustrated as configured as slave elements, system 100 may include any suitable number of slave elements to communicate with master 104. Elements 104, 106, 108 may be built within a common die, device, or other mechanism, such as a microcontroller 102.

Master 104 may be communicatively coupled to slaves 106, 108 in any suitable manner. For example, master 104 may be communicatively coupled to each of slave 106, slave 108 through separate serial data-out (SDO) lines and separate slave select (SS) lines. Master 104 may be communicatively coupled to each of slave 106, slave 108 through separate or common clock (SCLK) and serial data-in (SDI) lines. SDO lines may be used to issue data from master 104 to a given slave 106 or slave 108. SDI lines may be used to issue data from slave 106 or slave 108 to master 104. SCLK lines may be used to synchronize operations between the elements. SS lines may be used by master 104 to command individual slave elements 106, 108 that they are to wake up and receive or sense data.

Each of elements 104, 106, 108 may communicate via respective interfaces, such as interface 110, interface 112A, and interface 112B. Interface 110 may be configured to allow master 104 to communicate with slave units, and interfaces 112A, 112B may be configured to allow slaves 106, 108 to communicate with master 104. Interfaces 110, 112A, 112B may be implemented by any suitable combination of digital logic, analog circuitry, and digital circuitry.

In one embodiment, interface 110 in master 104 may be configured to automatically issue or assert a slave select signal to an appropriate slave element upon a request to transfer data to such a slave element. Interface 110 may obscure the requirement to otherwise have software of microcontroller 102 issue a command to interface 110 to issue or assert the slave select signal. In a further embodiment, interface 110 may automatically assert the slave select signal when a transfer count for a given slave element is set to a non-zero value. The selected slave select signal may correspond to the slave element to which data is to be transferred to or from.

Transfer of data between master 104 and slaves 106, 108 may be performed in, for example, a byte transfer mode or a packet transfer mode. In a byte transfer mode, each transfer of data may include sending or receiving a single byte of information. The byte may comprise a variable number of bits that is set by a bit number parameter. In a packet transfer mode, each transfer of data may include sending or receiving N bytes of data followed by a single, terminal byte of data, the byte including a variable number of bits that is set by a bit number parameter. Software commands to microcontroller 102 may establish the mode as well as parameters for N and the bit number parameter.

Figure 2:
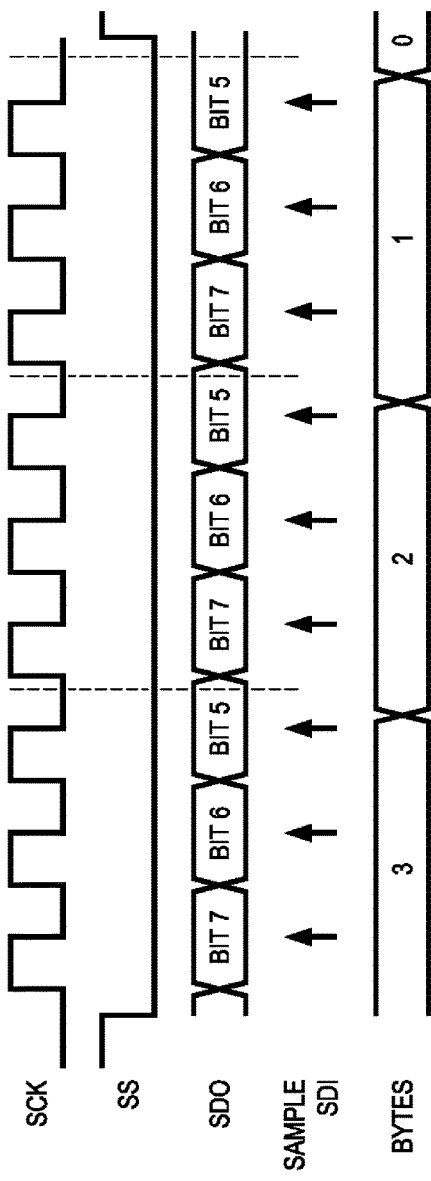
FIG. 2 illustrates timing of transfer between a master and a slave element when operating in a byte transfer mode, according to embodiments of the present disclosure.

FIG. 2 illustrates timing of transfer between a master 104 and a slave element when operating in a byte transfer mode, according to embodiments of the present disclosure. In the example of FIG. 2, the byte transfer mode may be configured to issue bits of data through the SDO line upon the falling edge of pulses of the slave clock line. To begin issuing data, the slave select line may be asserted (in this example, by being held low). Bits of information may be sent upon each clock pulse. Three bytes of data might be sent in three subsequent cycles of the transfer, wherein each byte is set by the bit parameter to be three bits long. Transfer may be terminated after the slave select line is de-asserted.

Figure 3:
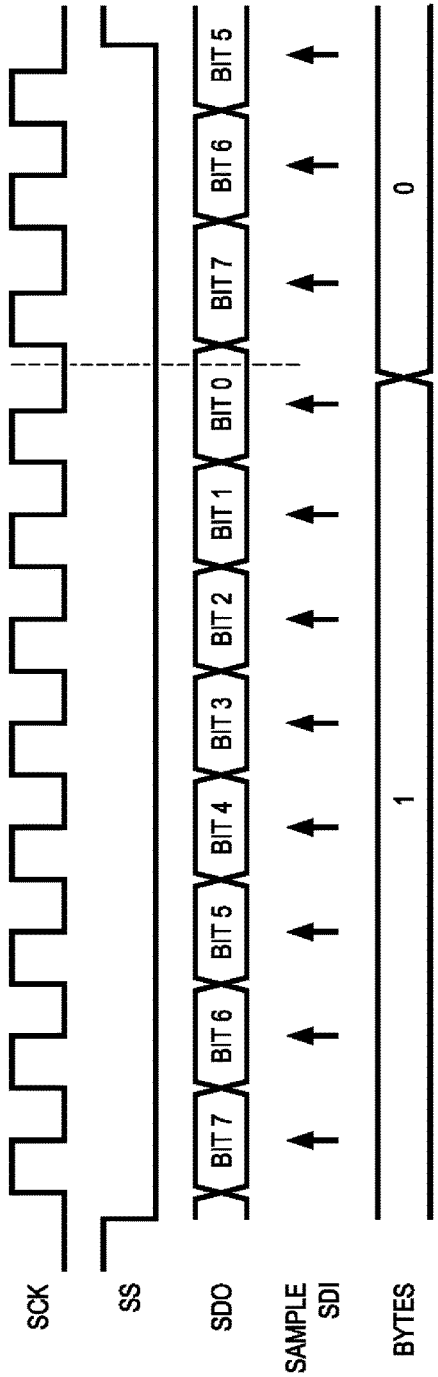
FIG. 3 illustrates timing of transfer between a master 104 and a slave element when operating in a packet transfer mode, according to embodiments of the present disclosure.
Figure 4:
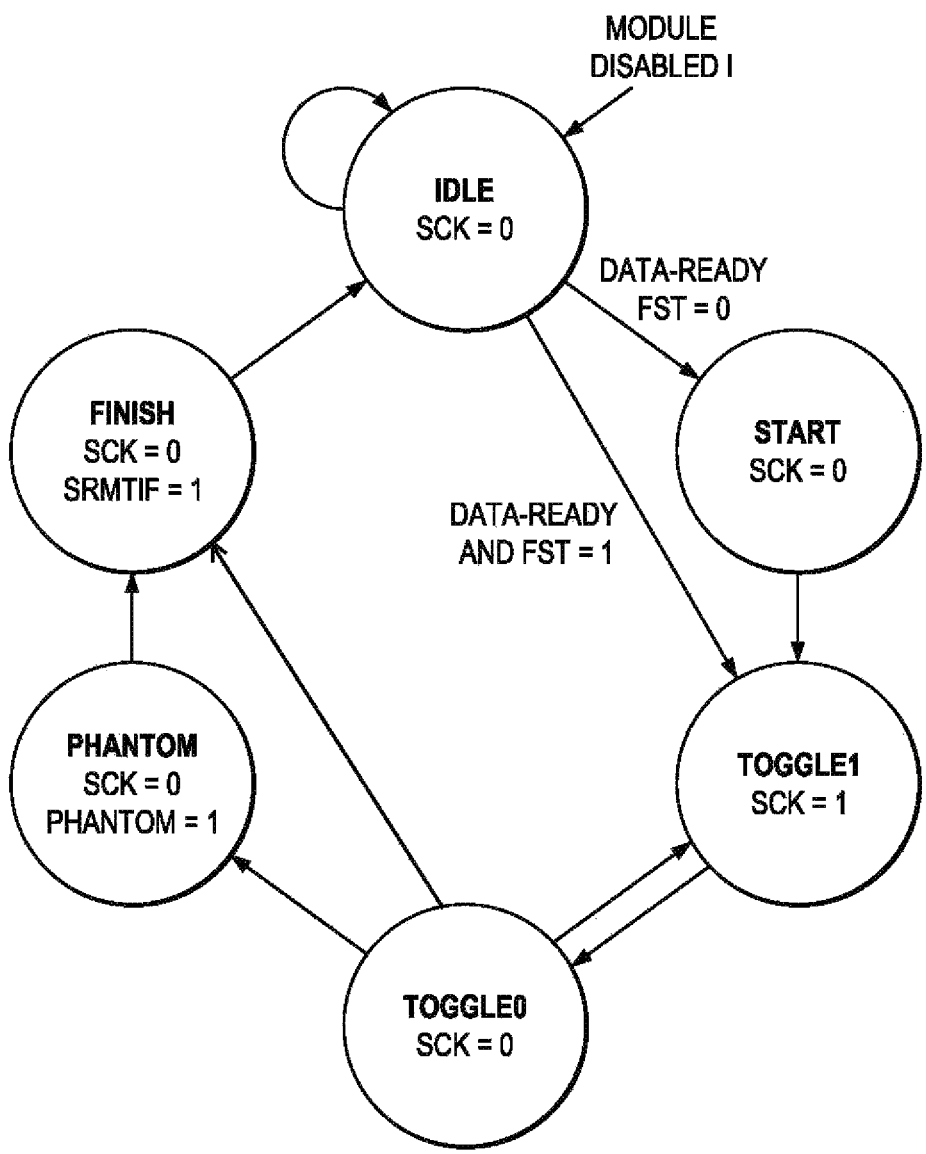
FIG. 4 illustrates an example state machine for operation of a slave master interface, according to embodiments of the present disclosure.

FIG. 3 illustrates timing of transfer between a master 104 and a slave element when operating in a packet transfer mode, according to embodiments of the present disclosure. In the example of FIG. 4, the packet transfer mode may be configured to issue bits of data after the slave select line is asserted in the amount of a specified single byte (by default, eight bits long) followed by a byte of a specified length of three bits.

Returning to FIG. 1, system 100 may simplify the software used to access SPI modules. System 100 may simplify the software by automatically asserting the slave select signal at precise, hardware-based times in order to ensure that the slave select signal functions correctly with respect to the slave clock. The slave clock and the slave select signal may have better relative timing. Relative timing may be defined according to a minimum response time. Such a guaranteed, minimum response time is difficult to implement with software, as calls to both signals must be made correctly in software and precise times, and must take into account various system clock and data transfer speeds.

In one embodiment, the slave select signal may be implemented as part of the same state machine in hardware that generates the slave clock generation. Thus, generation of the slave clock may by default also cause assertion of the slave select. Furthermore, this may guarantee a correct timing relationship between the slave clock and the slave select signal. In a further embodiment, the slave select signal may be gated by a transfer counter, allowing the slave select signal to be maintained even while not all data has been transferred. In yet a further embodiment, the slave select signal may then be de-asserted at an appropriate time after the data transfer has completed.

FIG. 4 illustrates an example state machine for operation of a slave master interface, according to embodiments of the present disclosure. Such an interface may include, for example, interface 110. The interface may be initiated by software calls to the interface. The states shown in FIG. 4 may include active states. Idle conditions might exist until user software prepares for a transfer by (a) setting the transfer counter (TC) to a non-zero value, (b) loading data to a transmitter buffer and (c) enabling the master module for data transfer. These data-ready conditions might be performed individually or in combination and in any order.

In a first idle state, the interface may wait until the TC is loaded with a value. The interface may poll the TC to see if the TC is equal to zero or is nonzero. Once the TC is nonzero, the slave select output may be asserted. The state machine may move to a start state or a toggle-1 state. The move to start state or toggle-1 state may depend on whether a fast start (FST) bit is set, designating how quickly and in what position the slave clock will begin operating. From the start state, the state machine may move to the toggle-1 state. The state machine may alternate between toggle-1 and toggle-0 states as the slave clock issues pulses to cause sending of data. The slave select output may be de-asserted a one-half baud after the falling edge of the last slave clock in a phantom state, or may be de-asserted one-half or one baud after such a falling edge in a finish state. Whether the phantom state is to be used may depend upon an option selected of precisely how soon the slave select should be de-asserted. Once finished, a flag (SRMTIF) may be set. Because the TC is decremented coincident with the last slave clock pulse, the slave select signal cannot be solely dependent upon the TC value, but instead is held in the asserted state until the state machine enters the FINISH state. Holding for a single ½ baud after the last clock is a traditional timing choice; the timing requirement is met as long as the slave select signal simply extends beyond the final slave clock edge.

If the user wishes to perform multiple data transfer operations under the same slave select output transfer packet, there may be a need to keep Slave Select asserted between the two transfers. Further, the slave select should stay asserted even if the state machine goes to FINISH or IDLE states while TC is zero. Finally, software calls may be made to force an assert of the slave select signal by setting a bit (SSET) in a register (SPIxCON2). Software calls to clear SSET bit will not deassert the slave select if TC is non-zero.

Figure 5:
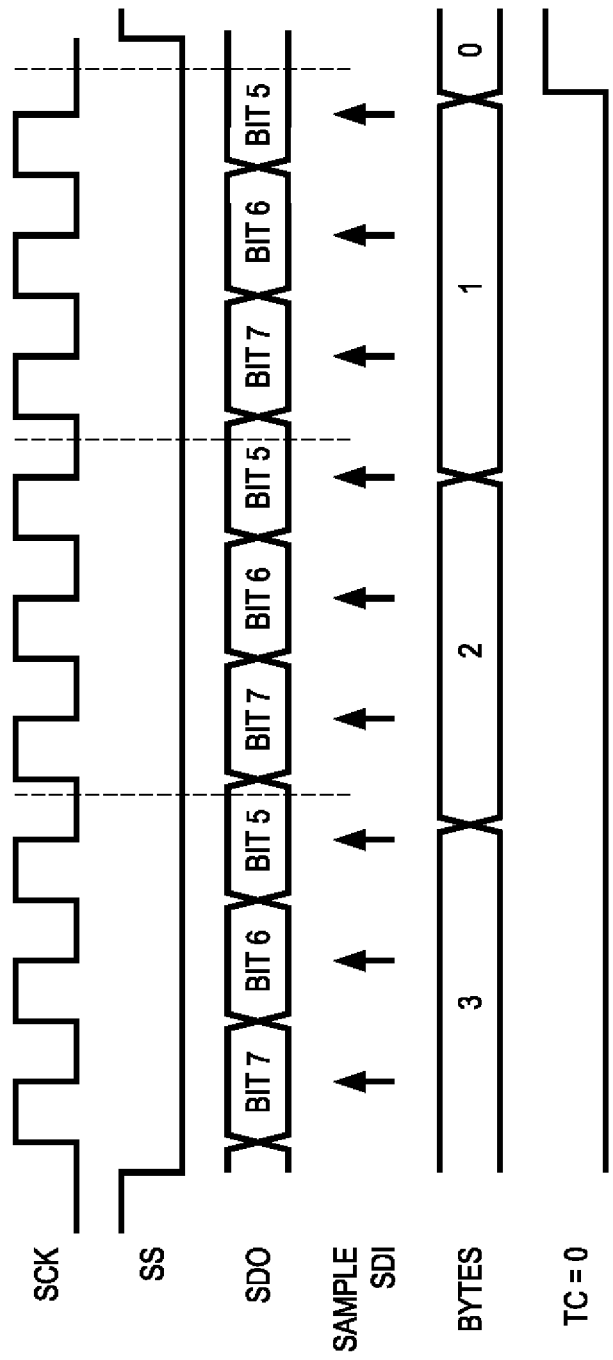
FIG. 5 illustrates a timing diagram further illustrating the relationship of transfer counts and the automatic slave select signal, according to embodiments of the present disclosure.

FIG. 5 illustrates a timing diagram further illustrating the relationship of transfer counts and the automatic slave select signal, according to embodiments of the present disclosure. When the TC is set to zero, the "TC=0" check shown in FIG. 5 may be high. When the TC is loaded with values, the "TC=0" check shown in FIG. 5 may be low. The transfer-count-based, automatic slave select operates interface 110 module in SPI master mode. The output timing asserts when the user, through software, sets transfer count associated with a transfer mode to a non-zero value. The hardware guarantees that slave select signals appear at least one clock before first slave clock edge and stays asserted until the TC becomes 0. Furthermore, the hardware guarantees that the slave select signal de-asserts at least one half baud clock after the final slave clock edge. The TC value may be initially set appropriately based on byte or packet transfer mode, such as eight times the number of bytes times the number of bits in byte transfer mode, or to eight times the number of bytes times eight, plus the number of trailing bits in packet transfer mode.

Returning to FIG. 1, system 100 may thus enable timing accuracy rather than simply using software to assert the slave select output. Timing between slave select and slave clock cannot be violated, even with fast and varied oscillators and clock. When automatic slave select generation is used, software calls are simplified, as the software calls do not need to assert or de-assert slave select output. Slave select output may automatically de-assert after transfer count becomes zero. Furthermore, system 100 may integrate with DMA-based transfers, wherein software does not need to monitor DMA.

As discussed above, the automatic generation of slave select signals may be enabled or disabled using, for example, a specified bit. While such a bit is used, slave select outputs may be automatically asserted and de-asserted based upon the TC.

An example of turning the automatic generation of slave select signals on and off include EEPROM data transfer. In such a case, master 104 may send a READ command and then read back data from EEPROM. The automatic generation of slave select signals might be overridden when sending command bytes, but enabled for data bytes. Software calls may ensure that these overlap. Master 104 might be set in byte transfer mode and transmit-only mode. The automatic generation of slave select signals might be disabled or, more simply, the slave select signal may be manually set by setting a bit. The command bytes may be issued from master 104 to a slave element. Subsequently, once the commands are transmitted, the SPI protocol for master 104 may be switched to a receive-only mode. The transfer count may be set to the number of bytes to be read. The bit for the manual assertion of the slave select signal may be cleared. Subsequently, the de-assertion of the slave select signal might be handled automatically. As the TC is nonzero, the slave select may remain asserted until the transfer finishes. Afterwards, the slave select may be automatically de-asserted at the end of the transfer.

Figure 6:
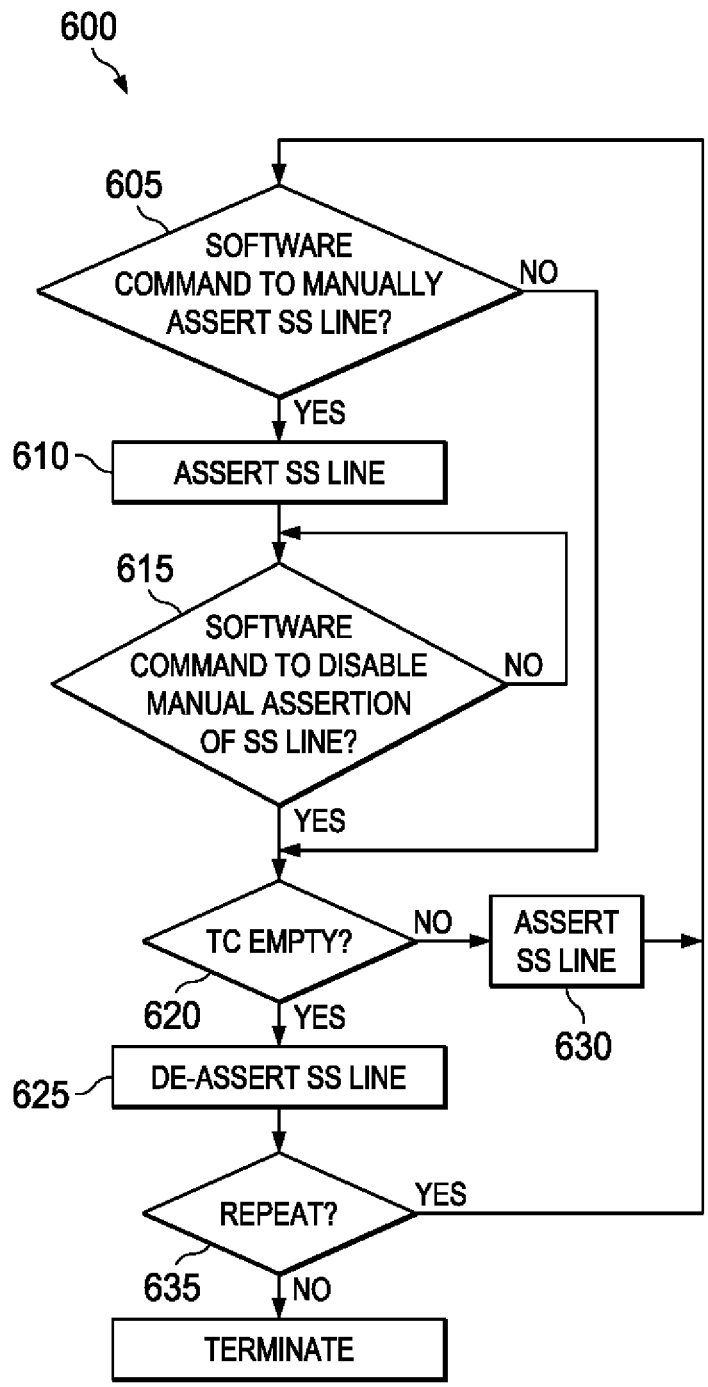
FIG. 6 illustrates an example method for using automatic generation of slave select signals, according to embodiments of the present disclosure.

FIG. 6 illustrates an example method 600 for using automatic generation of slave select signals, according to embodiments of the present disclosure.

At 605, parameters for operation of a master interface may be set by, for example, software operations upon a microcontroller. The parameters may specify how many bits or bytes are to be received in transfers between slave and master elements. The parameters may also specify whether an automatic generation of slave select signals is enabled or overwritten. The override may specify that, regardless of automatic generation conditions, the slave select signal is to be generated.

If a software command has been received to manually assert a slave select line, overriding the automatic generation and de-assertion of slave select lines, method 600 may proceed to 610. Otherwise, method 600 may proceed to 620. Determination of such a software command may be made by, for example, determining whether a corresponding bit has been set. 605 may be also executed via interrupt to hardware that is performing the remainder of method 600.

At 610, the slave select line may be asserted. While the slave select line is asserted, in parallel to the steps of method 600, data may be transferred between master and slave elements.

At 615, it may be determined whether the manual assertion of the slave select line has been rescinded. Rescinding the manual assertion of the slave select line might not specifically imply a manual de-assertion of the slave select line. Determination of rescinding the manual assertion of the slave select line might be made by, for example, determining whether the corresponding bit has been cleared. If the bit has been cleared, method 600 may proceed to 620. Otherwise, method 600 may repeat at 615.

At 620, it may be determined whether the TC is empty. While data is transferred in steps parallel to method 600, the TC may be otherwise decremented. If the TC is empty, method 600 may proceed to 630. If the TC is not empty, method 600 may proceed to 625.

At 625, the slave select line may be de-asserted. Method 600 may proceed to 635.

At 630, the slave select line may be asserted. Method 600 may return to 605.

At 635, it may be determined whether method 600 should repeat or terminate. Method 600 may repeat at, for example, 605.

Method 600 may be implemented by any suitable mechanism, such as by system 100 and the elements of one or more of FIGS. 1-5. In particular, method 600 may be performed by a slave interface. Method 600 may optionally repeat or terminate at any suitable point. Moreover, although a certain number of steps are illustrated to implement method 600, the steps of method 600 may be optionally repeated, performed in parallel or recursively with one another, omitted, or otherwise modified as needed. Method 600 may initiate at any suitable point, such as at 605.

Although example embodiments have been described above, other variations and embodiments may be made from this disclosure without departing from the spirit and scope of these embodiments.

The invention claimed is:

1. A serial peripheral interface (SPI) module, comprising:
   a transceiver comprising a clock line, a data line and at least one slave select line and being configurable to perform data transmission according to the SPI protocol; and
   an interface circuit configured to operate in a first operating mode and in a second operating mode, wherein in the first operating mode, the slave select line must be controlled manually and in the second operating mode upon a request to transfer data to a slave device, the interface circuit is configured to automatically assert the slave select line at least one clock before a first clock edge is generated and maintained asserted for a plurality of clock cycles while data is transferred.

2. The module of claim 1, wherein, in the second operating mode, the interface circuit is further configured to maintain the slave select line as asserted until a transfer count reaches zero.

3. The module of claim 1, wherein, in the second operating mode, the interface circuit is further configured to de-assert the slave select line a predetermined time after a final clock edge.

4. The module of claim 1, wherein, in the second operating mode, the interface circuit is further configured to de-assert the slave select line one-half baud clock after a final clock edge.

5. The module of claim 1, wherein the interface circuit is further configured to operate in a programmable size byte transfer mode and in a programmable packet transfer mode.

6. The module of claim 1, wherein the interface circuit is further configured to operate in a programmable size byte transfer mode, wherein each byte comprises a programmable number of bits.

7. The module of claim 1, wherein the interface circuit is further configured to operate in a programmable packet transfer mode, wherein:
   a total number of bits to be transferred is programmable;
   a first parameter defines the number of 8-bit bytes to be transferred for a packet; and
   a second parameter defines the number of bits of a last transfer for the packet.

8. The module of claim 1, wherein, in the second operating mode, the interface circuit is further configured to assert the slave select line based upon a transfer count including a nonzero value.

9. The module of claim 1, wherein the interface circuit is further configured to assert the slave select line upon determination of an override of the automatic slave select mode.

10. The module of claim 1, wherein the interface circuit is further configured to:
    assert the slave select line upon determination of an override of the automatic slave select mode; and
    after removal of the override of the automatic slave select mode, evaluate a transfer count to determine whether to de-assert the slave select line.

11. A microcontroller comprising a module according to claim 1.

12. A method of serial protocol interface data transfer according to the SPI protocol, comprising:
    communicating from a master element to a slave element using a clock line, a data line and at least one slave select line; and
    programming the master to operate in an automatic slave select mode;
    when operating in the automatic slave select mode, upon a request to transfer data to a slave device including automatically asserting the slave select line at least one clock before a first clock edge is generated and maintained asserted for a plurality of clock cycles while data is transferred.

13. The method of claim 12, further comprising maintaining the slave select line as asserted until a transfer count reaches zero.

14. The method of claim 12, further comprising de-asserting the slave select line a predetermined time after a final clock edge.

15. The method of claim 12, further comprising de-asserting the slave select line one-half baud clock after a final clock edge.

16. The method of claim 12, further comprising operating in a programmable size byte transfer mode and in a programmable packet transfer mode.

17. The method of claim 12 further comprising operating in a programmable size byte transfer mode, wherein each byte comprises a programmable number of bits.

18. The method of claim 12, further comprising operating in a programmable packet transfer mode, wherein:
    a total number of bits to be transferred is programmable;
    a first parameter defines the number of 8-bit bytes to be transferred for a packet; and
    a second parameter defines the number of bits of a last transfer for the packet.

19. The method of claim 12, further comprising asserting the slave select line based upon a transfer count including a nonzero value.

20. The method of claim 12, further comprising asserting the slave select line upon determination of an override of the automatic slave select mode.

21. The method of claim 12, further comprising:
   asserting the slave select line upon determination of an override of the automatic slave select mode; and
   after removal of the override of the automatic slave select mode, evaluating a transfer count to determine whether to de-assert the slave select line.

22. A microcontroller comprising a serial peripheral interface (SPI) module, wherein the SPI module comprises:
   a transceiver comprising a clock line, a data line and at least one slave select line and being configurable to perform data transmission according to the SPI protocol; and
   an interface circuit configured to operate in in an automatic slave select operating mode, in which upon a request to transfer data to a slave device issued by the microcontroller to the SPI module, the interface circuit is configured to automatically assert the slave select line at least one clock before a first clock edge and associated data is generated without requiring additional software to assert the slave select line and maintained asserted for a plurality of clock cycles while data is transferred.

* * * * *